United States Patent
Schmidt et al.

(10) Patent No.: US 9,161,144 B2
(45) Date of Patent: Oct. 13, 2015

(54) METHOD FOR DETERMINING A TRANSMISSION QUALITY WHEN RECEIVING AUDIO SIGNALS AND RECEIVING UNIT

(71) Applicants: Sennheiser electronic GmbH & Co. KG, Wedemark (DE); Friedrich-Alexander-Universitaet Erlangen-Nuernberg, Erlangen (DE)

(72) Inventors: Axel Schmidt, Wedemark (DE); Georg Fischer, Nuremberg (DE); Johannes Brendel, Erlangen (DE)

(73) Assignees: Sennheiser electronic GmbH & Co. KG, Wedemark (DE); Friedrich-Alexander-Universiaet Erlangen-Nuernberg, Erlangen (DE)

( * ) Notice: Subject to any disclaimer, the term of this patent is extended or adjusted under 35 U.S.C. 154(b) by 295 days.

(21) Appl. No.: 13/693,595

(22) Filed: Dec. 4, 2012

(65) Prior Publication Data
US 2013/0148816 A1 Jun. 13, 2013

(51) Int. Cl.
*H04L 27/14* (2006.01)
*H04R 29/00* (2006.01)
*H04L 1/20* (2006.01)

(52) U.S. Cl.
CPC .............. *H04R 29/00* (2013.01); *H04L 1/206* (2013.01)

(58) Field of Classification Search
CPC ................................ H04L 1/0026; H04L 7/14
USPC ......................................... 375/316, 334, 346
See application file for complete search history.

(56) References Cited

U.S. PATENT DOCUMENTS

| | | | |
|---|---|---|---|
| 8,892,430 B2 * | 11/2014 | Tanaka et al. | 704/226 |
| 2011/0312291 A1 * | 12/2011 | Briffett | 455/226.1 |
| 2012/0319774 A1 * | 12/2012 | Ibrahim et al. | 330/129 |

* cited by examiner

*Primary Examiner* — Kevin Kim
(74) *Attorney, Agent, or Firm* — Frommer Lawrence & Haug LLP

(57) ABSTRACT

There is provided a method of determining a transmission quality when receiving audio signals which are transmitted over a frequency-modulated path in analog form. For that purpose a frequency-modulated audio signal is received and IQ demodulation of the input signal is implemented. The I- and the Q-path of the demodulated baseband signal are subjected to analog/digital conversion. Alternatively the input signal can first be digitized and then subjected to IQ demodulation. A multiplicity of N samples is detected. The amount of the N samples is formed. A reference value is determined from the amount of the N samples. Each of the N samples is standardized to the reference value. A measurement in respect of the fluctuations in the standardized amounts is determined. The measurement in respect of the fluctuations indicates the quality of the transmission path.

7 Claims, 4 Drawing Sheets

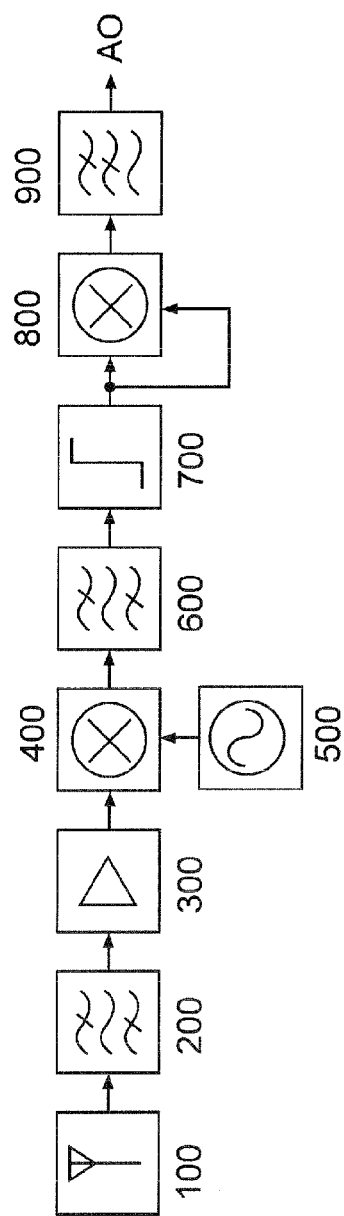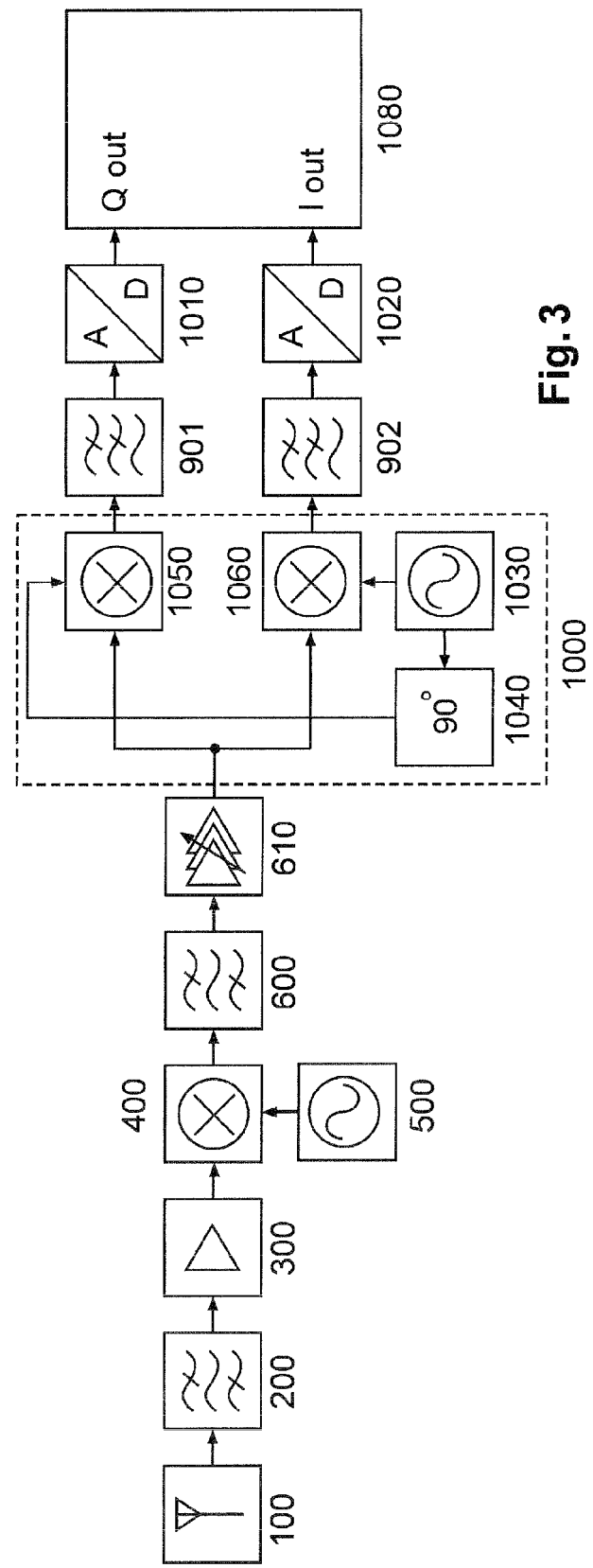

METHOD FOR DETERMINING A TRANSMISSION QUALITY WHEN RECEIVING AUDIO SIGNALS AND RECEIVING UNIT

The present application claims priority from German Patent Application No. DE 10 2011 087 745.2, filed on Dec. 5, 2011, the disclosure of which is incorporated herein by reference in its entirety.

FIELD OF THE INVENTION

The present invention concerns a method of determining a transmission quality when receiving audio signals and a receiving unit.

It is noted that citation or identification of any document in this application is not an admission that such document is available as prior art to the present invention.

The transmission quality (LQI—Link Quality Indicator) of present day FM (frequency modulation) paths for audio transmission is assessed on the basis of the measured receiving power of the input signal, the so-called RSSI value (Received Signal Strength Indicator) and the subjective impression by the human ear. A disadvantage with both methods if that the ear only perceives inadequate quality if the interference situation has already occurred, subjective assessments can only be generalized with difficulty, automation of the hearing method is extremely difficult and the RSSI value only indicates that there is power in the channel, but does not distinguish between the useful signal and inband interferers, that is to say a high RSSI value does not allow information as to whether there is a high useful signal or a high interference signal or two approximately equal useful and interference signals.

Evaluation of the RSSI for assessing the transmission quality is therefore meaningful only when the system is adversely affected only by thermal noise.

FIG. 1 shows a constellation diagram of a QPSK and in particular a view of the EVM value. In digital transmission systems the transmission quality can be ascertained by way of the EVM value (Error Vector Magnitude) which specifies the extent to which the received point in the constellation diagram departs from the point which is ideally to be expected, standardized to the mean spacing of the constellation points on the coordinate origin.

FIG. 2 shows a general block circuit diagram for an analog FM (frequency-modulated) frontend. The radio part of conventional FM receivers is of an analog structure. The arriving analog RF signal is received by way of the antenna 100, subjected to filtering 200, amplified by the LNA 300 and down-mixed at the first mixer 400 to the first IF. After channel filtering 600 the signal is inputted to a limiter 700 whose output feeds the FM (frequency-modulated) demodulator 800. The output of the FM demodulator 800 is subjected to low pass filtering by a low pass filter 900. The output of the low pass filter 900 is the output signal AO.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

An object of the invention is to provide a method which makes it possible to objectively measure the transmission quality of an FM path in operation.

Thus there is provided a method of determining a transmission quality upon receiving audio signals which are transmitted over a frequency-modulated path in analog form. For that purpose a frequency-modulated audio signal is received and IQ demodulation of the input signal is implemented. The I- and the Q-path of the demodulated baseband signal are subjected to analog/digital conversion. Alternatively the input signal can first be digitized and then subjected to IQ demodulation. A multiplicity of N samples is detected. The amount of the N samples is formed. A reference value is determined from the amount of the N samples. Each of the N samples is standardized to the reference value. A measurement in respect of the fluctuations in the standardized amounts is determined. The measurement in respect of the fluctuations indicates the quality of the transmission path.

In an aspect of the invention measures for increasing the transmission quality are initiated if the measurement in respect fluctuations or the gradient of the measurement exceeds a threshold value. Measures are: frequency change of the frequency-modulated path or an increase in the transmitter power of the transmitter of the frequency-modulated path or a reduction in the transmission power of the interference transmitter or transmitters if there are a plurality thereof or the interference signal is a product of a plurality of transmitters (for example 3rd-order intermodulation products).

In a further aspect of the present invention the measurement in respect of the fluctuations represents a standard deviation or a mean absolute deviation.

In a further aspect of the invention the distribution of the amounts is determined in order to be able to draw therefrom conclusions about interference sources in the transmission path.

In a further aspect of the present invention the kurtosis factor is determined as a measurement in respect of the distribution of the amount of the N samples.

In a further aspect of the present invention what interference source is present in the FM path is deduced on the basis of the distribution of the amounts or the kurtosis factor.

The invention concerns the notion that EVM evaluation is not possible in an analog transmission method. Therefore recourse is made to another method of determining the transmission quality LQI.

In accordance with the invention therefore analog frequency modulation (which has a constant envelope, that is to say a constant amplitude) is to be combined with an inphase/quadrature (IQ) demodulator. The input signal is subjected to IQ demodulation and the output signals from IQ demodulation are digitized. It is equally possible for the input signal to be first digitized and thereafter demodulated. A number of N samples of the digitized input signals is detected and the amount of the N samples is formed. In that respect it should be noted that the samples of the digitized input signals represent complex numbers so that the amount B represents the root from the sum of the squares of the I-path and the Q-path. The amounts are standardized to a reference value. A measurement in respect of the fluctuations in the amounts is then determined. The measurement in respect of the fluctuations in the amounts indicates the quility of the path. As a consequence thereof the frequency of the FM path can be changed or the power of the FM path can be increased.

BRIEF DESCRIPTION OF THE DRAWINGS

FIG. 2 shows a general block circuit diagram for an analog FM frontend;

FIG. 3 shows a block diagram of a frontend with IQ demodulator according to a first embodiment;

DETAILED DESCRIPTION OF EMBODIMENTS

Figure 1:
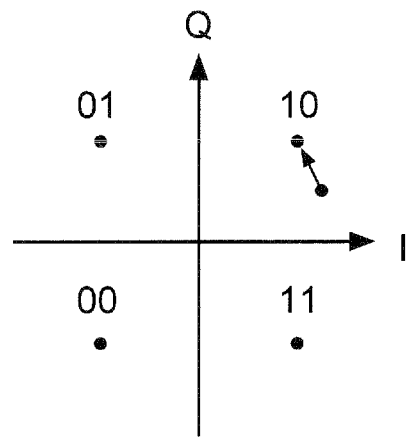
FIG. 1 shows a constellation diagram of a QPSK and in particular a view of the EVM value.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

FIG. 3 shows a block diagram of a frontend with IQ demodulator according to a first embodiment. A frontend unit according to the first embodiment is part of a receiver and has an antenna 100, a filter 200, an LNA 300 and a first mixer 400 which down-mixes the signal to a first intermediate frequency IE Channel filtering 600 is then provided. The output of the channel filtering 600 is passed to the IQ demodulator 1000. The IQ demodulator 1000 divides the output of the channel filtering 600 into an I-path and a Q-path. The IQ demodulator 1000 has a frequency generator 1030. Provided in the I-path is a mixer 1060 which mixes the output signal of the channel filtering 600 with the signal generated by the frequency generator 1030. The output signal is subjected to low pass filtering by a low pass filter 902. Analog/digital conversion is then effected in an analog/digital converter 1020. The digitized signal then represents the output of the I-path and is fed to a digital signal processing unit 1080. Provided in the Q-path is a mixer 1050 which mixes the output signal of the channel filtering 600 with an output signal, phase-shifted through 90°, of the frequency generator 1030. The output signal of the mixer 1050 is subjected to low pass filtering by a low pass filter 901 and the output signal of the low pass filter 901 is subjected to A/D conversion in an A/D converter 1010. In that case the digitized output signal corresponds to the output of the Q-path and is fed to the digital signal processing unit 1080.

In, accordance with the invention IQ demodulation is implemented instead of the FM demodulation. The input signal is demodulated by means of an inphase/quadrature method (I/Q method), by an IQ demodulator 1000 being introduced instead of the limiter and the FM demodulator and by analog/digital conversion 1010, 1020 thereafter being implemented. The I and Q output signals $I_{out}$, $Q_{out}$ can then be subjected to further digital processing. Alternatively digital conversion can already be effected downstream of the AGC 610 and the digital signal can then be subjected to IQ demodulation.

Optionally there can be provided an automatic gain control unit AGC 610. The automatic gain control unit 610 serves to compensate for or adapt fluctuations in the audio signal in transmission by way of the channel.

Figure 4:
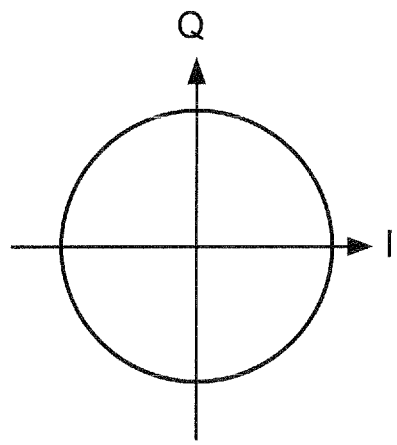
FIG. 4 shows a constellation diagram in the case of ideal FM transmission in accordance with the first embodiment.

FIG. 4 shows a constellation diagram in respect of ideal FM transmission according to the first embodiment. If the received I/Q signals are imaged on a complex plane, then in the case of FM transmission in the ideal case that involves a rotating circle as FM signals do not have any amplitude component.

If an interference signal is superimposed on the transmission signal or if the signal-noise ratio (SNR) is too low, amplitude fluctuations are present on the unit circle in FIG. 4. If now the standard deviation of the amount of the standardized unit circle is calculated in relation to a number N of inputted I/Q samples, that gives a quantitative measurement in respect of the quality of wireless transmission.

Figure 5:
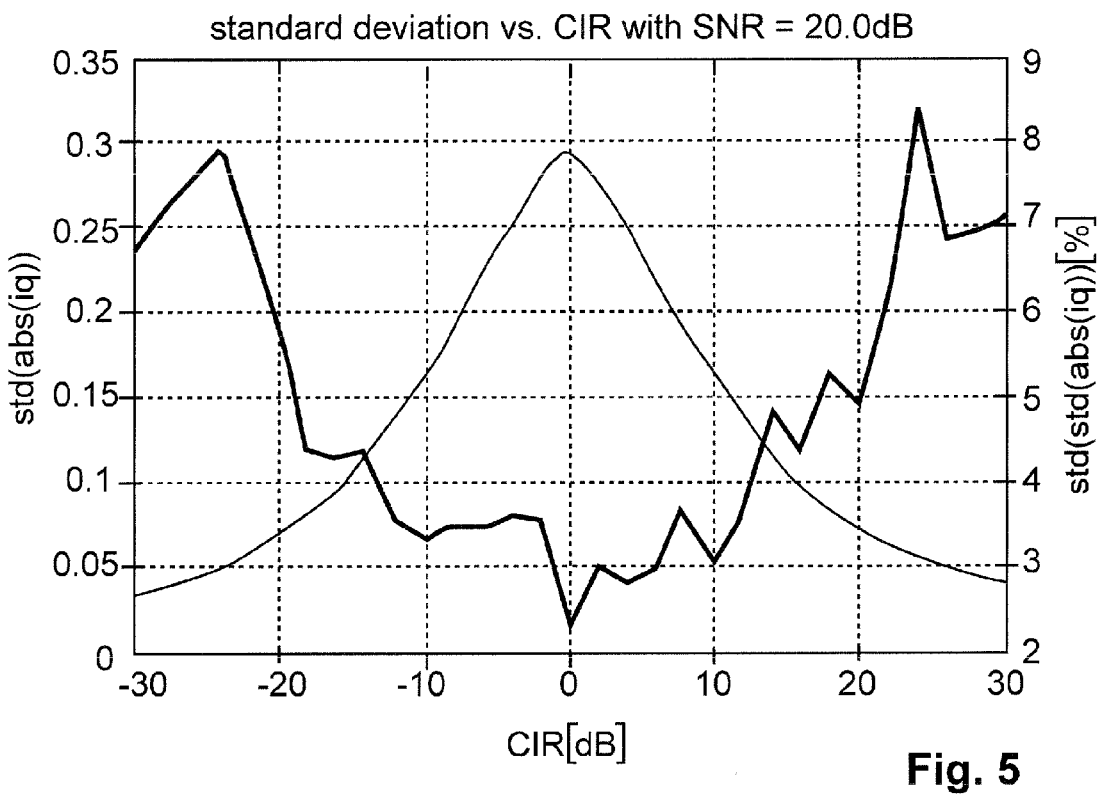
FIG. 5 shows a graph as a simulation result illustrating the configuration of the standard deviation as a function of carrier-interferer ratio (CIR) inclusive of the deviation of the simulated standard deviation [%] as a measurement in respect of the possible measuring accuracy.

FIG. 5 shows a graph as a simulation result in respect of the configuration of the standard deviation as a function of a carrier-interferer ratio (CIR) inclusive of the deviation in respect of the simulated standard deviation in [%] as a measurement of the possible measuring accuracy. It will be seen that, with decreasing values of the standard deviation, the values of the deviation of the standard deviation increase and thus the measuring accuracy falls.

In the critical operating situation (−10 dB<CIR<10 dB) the level of accuracy of the measurement value is less than 4%, which shows that the standard deviation represents a reliable quality parameter. In the ideal case only a frontend with IQ demodulation is still used in order to digitally perform both LQI and FM demodulation.

By virtue of I/Q demodulation it is additionally possible to ascertain more extensive information about the nature of the interference. It is possible from N measured I/Q samples to calculate the frequency distribution of the amount. Thus, depending on the respective interference signal, that involves a typical distribution function.

Figure 6:
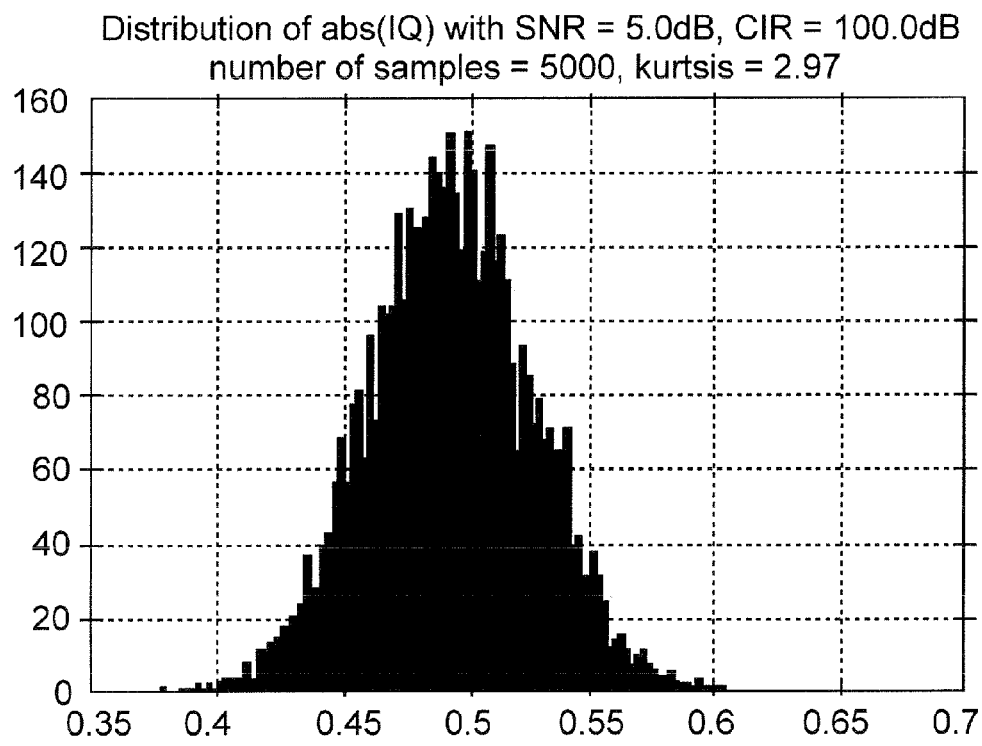
FIG. 6 shows a graph in respect of the frequency distribution of the amount in the case of a noise-like interference.

FIG. 6 shows a graph in respect of frequency distribution of the amount in relation to a noise-like interference. If the interference involves exclusively a white Gaussian noise (WGN), then the frequency distribution resembles a Gaussian distribution.

Figure 7:
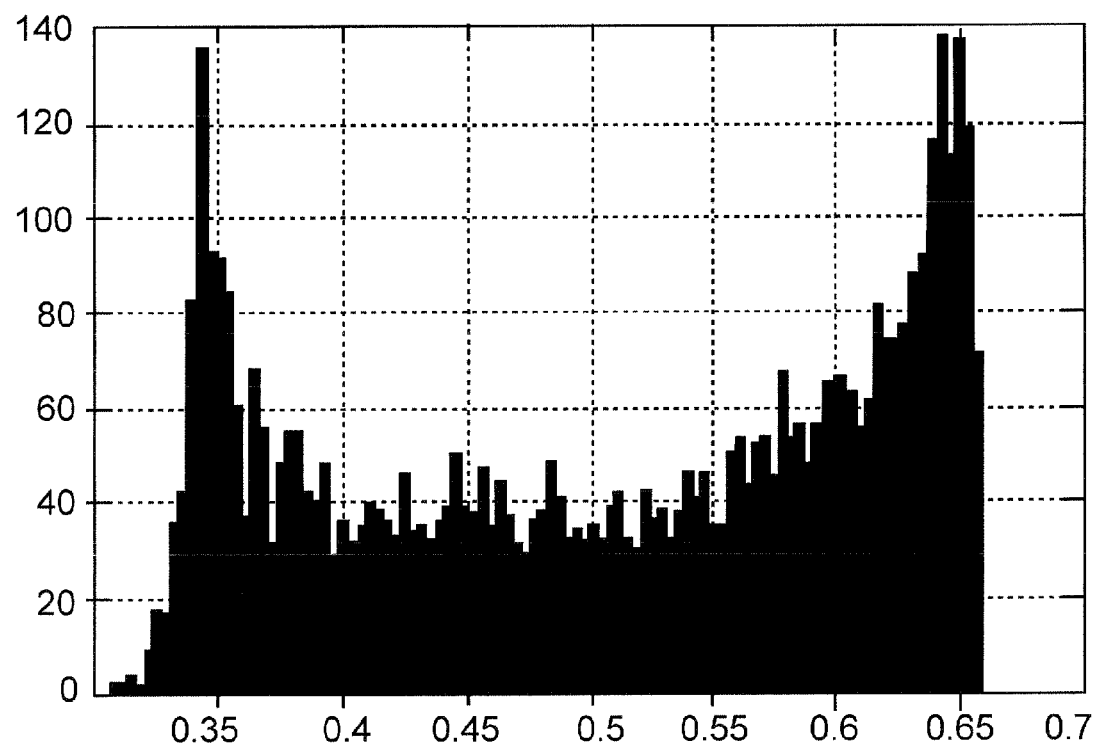
FIG. 7 shows a graph in respect of the frequency distribution of the amount in the event of interference by a second FM path.

FIG. 7 shows a graph in respect of the frequency distribution of the amount in relation to an interference due to a second FM path. If in contrast the interference involves an FM-modulated interferer then the frequency distribution resembles a bathtub function. With the statistical kurtosis measure:

$$k = \frac{\frac{1}{n}\sum_{i=1}^{n}(x_i - \bar{x})^4}{\left(\frac{1}{n}\sum_{i=1}^{n}(x_i - \bar{x})^2\right)^2}$$

with k=kurtosis and $\bar{x}$=mean value of the samples $x_i$ those two distribution functions can be distinguished. Thus calculation of the kurtosis in relation to the amount of the N measured I/Q samples is a measurement in respect of the nature of interference on the FM signal. That additional information makes it possible to more precisely assess the interference situation and to estimate the influence of the interference source on the subjective impression of the human ear.

FM signals whose SNR-value or CIR-value is far above 30 dB give a kurtosis value of markedly greater than 3.

In FIGS. 6 and 7 the X-axis represents the amount of the IQ samples.

FIGS. 6 and 7 show graphs based on 5000 samples. In the FIG. 6 graph the kurtosis value is 2.97 while in the FIG. 7 graph the kurtosis value is 1.59. In regard to the distribution function shown in FIG. 6 with a frequency substantially in the center around 0.5 it can be assumed that there is a Gaussian noise as interference in the FM path.

In contrast thereto the distribution function in FIG. 7 rather resembles a bathtub and leads to the conclusion that there is a second interferer in the FM path. Thus conclusions about the interferer or interferers in the FM path can be deduced by analysis of the distribution function.

According to the invention a standard deviation or a mean quadratic deviation can be used as a measurement in respect of the fluctuations in the standardized amounts. As an alternative thereto a mean absolute deviation can be used as a measurement in respect of the fluctuations. The mean absolute deviation has the advantage that, instead of squaring, only simple amount formation is needed. Optionally, errors in an individual sample can be weighted.

As the output signals of the IQ demodulator are complex numbers the amount of those number is described by the following formula:

$$B = \sqrt{I^2 + Q^2}$$

wherein B is the amount of the complex number.

According to the invention the fluctuations in amplitude are detected while according to the invention a reference value is determined from the amount of the N samples. That reference value can be based on a relative error. The amounts of the detected digitized input signals are standardized to the reference value and a measurement in respect of the fluctuations is determined by means of a standard deviation.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method of determining a transmission quality when receiving audio signals which are transmitted in analog form by way of a frequency-modulated transmission path, comprising the steps:
receiving a frequency-modulated audio signal;
a step comprising:
performing an IQ demodulation of the frequency-modulated audio signal and subsequent digitization of the I- and Q-signals; or
digitizing the received frequency-modulated audio signal and subsequent implementation of a digital IQ demodulation; and
performing digital signal processing with the digitized signals and checking amplitude fluctuations in the received analog frequency-modulated audio signal by:
acquiring a plurality of N samples of the digitized input signals;
calculating the amount (B) of the N samples;
determining a reference value (R);
standardizing each of the N samples of the amount (B) to the reference value (R); and
determining a measurement in respect of fluctuations in the standardized amounts of the N samples;
wherein the measurement, in respect of the fluctuations, indicates the quality of the path, and
wherein a measure for increasing the transmission quality is initiated if the measurement in respect of the fluctuations exceeds a threshold value.

2. A method of determining a transmission quality when receiving audio signals which are transmitted in analog form by way of a frequency-modulated transmission path, comprising the steps:
receiving a frequency-modulated audio signal;
a step comprising:
performing an IQ demodulation of the frequency-modulated audio signal and subsequent digitization of the I- and Q-signals; or
digitizing the received frequency-modulated audio signal and subsequent implementation of a digital IQ demodulation; and
performing digital signal processing with the digitized signals and checking amplitude fluctuations in the received analog frequency-modulated audio signal by:
acquiring a plurality of N samples of the digitized input signals;
calculating the amount (B) of the N samples;
determining a reference value (R);
standardizing each of the N samples of the amount (B) to the reference value (R); and
determining a measurement in respect of fluctuations in the standardized amounts of the N samples;
wherein the measurement, in respect of the fluctuations, indicates the quality of the path,
wherein a measure for increasing the transmission quality is initiated if the measurement in respect of the fluctuations exceeds a threshold value,
wherein said measure comprises at least one step selected from the group consisting of:
altering the frequency of the frequency-modulated path;
increasing the power of a transmitter of the frequency-modulated path; and
reducing the power of an interfering transmitter.

3. The method as set forth in claim 1;
wherein the measurement in respect of the fluctuations is calculated by a standard deviation or a mean absolute deviation.

4. A method of determining a transmission quality when receiving audio signals which are transmitted in analog form by way of a frequency-modulated transmission path, comprising the steps:
receiving a frequency-modulated audio signal;
a step comprising:

performing an IQ demodulation of the frequency-modulated audio signal and subsequent digitization of the I- and Q-signals; or digitizing the received frequency-modulated audio signal and subsequent implementation of a digital IQ demodulation; and performing digital signal processing with the digitized signals and checking amplitude fluctuations in the received analog frequency-modulated audio signal by:

acquiring a plurality of N samples of the digitized input signals;

calculating the amount (B) of the N samples;

determining a reference value (R);

standardizing each of the N samples of the amount (B) to the reference value (R);

determining a measurement in respect of fluctuations in the standardized amounts of the N samples;

wherein the measurement, in respect of the fluctuations, indicates the quality of the path, and determining a distribution of the amounts (B) for detecting interferers in the transmission path.

5. The method as set forth in claim 4, further comprising: determining a kurtosis factor for distribution of the amounts of the number of N samples.

6. The method as set forth in claim 4, further comprising: deducing which interferer is present in the transmission path, based on the distribution of the amounts of a kurtosis.

7. A receiving unit for receiving audio signals which are transmitted in analog form by way of a frequency-modulated transmission path, comprising a receiving unit configured to receive a frequency-modulated audio signal;

an IQ demodulator configured to perform an IQ demodulation of the frequency-modulated audio signal and subsequent digitization of the I- and Q-signals, or to digitize the received frequency-modulated audio signal and subsequent implementation of digital IQ demodulation;

a digital signal processing unit configured to perform digital signal processing of the digital signals, to check audio fluctuations in the received analog frequency-modulated audio signals, by:

acquiring a plurality of N samples of the digitized input signals;

by calculating the amount (B) of the N samples;

by determining a reference value (R);

by standardizing each of the N samples to the reference value (R); and by determining a measurement in respect of fluctuations in the standardized amounts of the N samples;

wherein the measurement of the fluctuations indicates the quality of the path, and wherein a measure for increasing the transmission quality is initiated if the measurement in respect of the fluctuations exceeds a threshold value.

* * * * *